US009592480B2

(12) United States Patent
Cramb et al.

(10) Patent No.: US 9,592,480 B2
(45) Date of Patent: Mar. 14, 2017

(54) INNER PREMIX TUBE AIR WIPE (71) Applicant: Solar Turbines Incorporated, San Diego, CA (US)

(72) Inventors: Donald James Cramb, San Diego, CA (US); James Scott Piper, Bonita, CA (US); Sean Kelly Spivey, La Mesa, CA (US); Michael John Ramotowski, San Diego, CA (US); Matthew Mayer, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 851 days.

(21) Appl. No.: 13/893,083

(22) Filed: May 13, 2013

(65) Prior Publication Data

US 2014/0332602 A1 Nov. 13, 2014

(51) Int. Cl.
F02C 1/00 (2006.01)
B01F 5/06 (2006.01)
F23R 3/14 (2006.01)
F23R 3/28 (2006.01)

(52) U.S. Cl.
CPC ............... B01F 5/06 (2013.01); F23R 3/14 (2013.01); F23R 3/283 (2013.01); F23R 3/286 (2013.01); F23R 2900/00017 (2013.01); F23R 2900/00019 (2013.01); Y02T 50/675 (2013.01); Y10T 29/4973 (2015.01)

(58) Field of Classification Search
CPC .. F02C 7/232; F02C 7/22; F02C 7/222; F02C 7/30; F23D 2209/30; F05B 2260/602
See application file for complete search history.

(56) References Cited

U.S. PATENT DOCUMENTS

| 6,178,752 | B1 | 1/2001 | Morford |
| 6,571,559 | B1* | 6/2003 | Fortuna ............... F02C 7/22 60/748 |
| 7,581,402 | B2 | 9/2009 | Parker |
| 8,186,162 | B2 | 5/2012 | Rogers et al. |
| 8,726,668 | B2* | 5/2014 | Patel ............... F23D 11/383 60/742 |
| 2003/0131600 | A1* | 7/2003 | David ............... F23D 11/107 60/737 |
| 2006/0029895 | A1 | 2/2006 | Vatsky |
| 2007/0028618 | A1* | 2/2007 | Hsiao ............... F23R 3/14 60/737 |

(Continued)

FOREIGN PATENT DOCUMENTS

| CN | 101424407 | 5/2009 |
| CN | 101529163 | 9/2009 |

Primary Examiner — Gerald L Sung
(74) Attorney, Agent, or Firm — Procopio, Cory, Hargreaves & Savitch, LLP (57) ABSTRACT An inner premix tube for a fuel injector of a gas turbine engine includes a transition end, a tip end, and a premix tube inner surface. The transition end includes an annular disk portion with an annular disk shape and a redirection portion extending radially inward and axially from the annular disk portion. The transition end also includes a plurality of wipe passages extending through the transition end. The tip end includes a cylindrical portion with a hollow right circular cylinder shape. The premix tube inner surface is a radially outer surface including the redirection portion outer surface and the cylindrical portion outer surface.

17 Claims, 6 Drawing Sheets (56) References Cited

U.S. PATENT DOCUMENTS

| | | |
|---|---|---|
| 2008/0295519 A1 | 12/2008 | Park |
| 2011/0005231 A1 | 1/2011 | Low |
| 2011/0067403 A1 | 3/2011 | Williams et al. |
| 2012/0324896 A1 | 12/2012 | Kim et al. |
| 2014/0190168 A1* | 7/2014 | Shershnyov ............ F23R 3/283 60/737 |

* cited by examiner

INNER PREMIX TUBE AIR WIPE

TECHNICAL FIELD

The present disclosure generally pertains to gas turbine engines, and is more particularly directed toward a fuel injector with an inner premix tube air wipe.

BACKGROUND

Gas turbine engines include compressor, combustor, and turbine sections. Fuel for gas turbine engines may accumulate on or adjacent to injector surfaces during gas turbine engine operation, which may lead to auto-ignition or flame holding.

U.S. Pat. No. 6,178,752 to S. Morford discloses a tangential entry, premixing fuel injector for the combustion chamber of a turbine engine. The injector includes a pair of arcuate scrolls defining the radially outer boundary of a mixing chamber and a pair of air entry slots for admitting a stream of primary combustion air tangentially into the mixing chamber. The scrolls also include an axially distributed array of primary fuel injection passages for injecting a primary fuel into the primary air stream. A flame stabilizing fuel injector centerbody includes an impingement and transpiration cooled outlet nozzle for introducing secondary fuel and secondary air into the combustion chamber. The nozzle includes an impingement plate with an array of impingement ports and a tip cap with an array of discharge passages. The impingement ports and discharge passages are in series flow, misaligned relationship so that secondary air exiting from the impingement ports impinges on the tip cap and flows through the core discharge passages to impingement cool and transpiration cool the nozzle.

The present disclosure is directed toward overcoming one or more of the problems discovered by the inventors.

SUMMARY OF THE DISCLOSURE

An inner premix tube for a fuel injector of a gas turbine engine is disclosed. The inner premix tube includes a transition end, a tip end, and a premix tube inner surface. The transition end includes an annular disk portion with an annular disk shape and a redirection portion extending radially inward and axially from the annular disk portion. The transition end also includes a plurality of wipe passages extends through the redirection portion of the transition end. The tip end is coaxial to the transition end. The tip end includes a cylindrical portion extending axially with a hollow right circular cylinder shape. The tip end also includes a tip face with an annular disk shape. The tip face extends radially inward from an axial end of cylindrical portion, distal to the transition end. The premix tube inner surface is a radially outer surface including the redirection portion outer surface and the cylindrical portion outer surface.

A method for overhauling a gas turbine engine injector is also disclosed. The method includes removing an outer premix barrel from the injector. The method also includes removing an inner premix tube from the injector. Removing the inner premix tube includes removing a retaining ring configured to secure inner premix tube to an injector body of the injector. The method further includes separating a tip portion from the inner premix tube. The tip portion including a tip end including a cylindrical portion with a hollow cylinder shape and a tip face with an annular disk shape. The method also includes joining a new tip portion to a remaining portion of the inner premix tube with a metal joining process. The remaining portion includes a transition end including an annular disk portion with an annular disk shape and a redirection portion extending radially inward and axially from the annular disk portion.

DETAILED DESCRIPTION

The systems and methods disclosed herein include a gas turbine engine injector including an inner premix tube. In embodiments, the inner premix tube includes a transition end, a middle tube, and a tip end. Wipe passages extend through the transition end of the inner premix tube. A premix tube inner surface is the radially outer surface of the inner premix tube extending from the transition end to the tip end. During operation of the gas turbine engine fuel may wet or accumulate on the premix tube inner surface, resulting in coking, auto ignition, flash back or flame holding. The wipe passages may direct air along the premix tube inner surface pushing the fuel off of the premix tube inner surface and preventing fuel from accumulating on the premix tube inner surface, which may prevent or reduce the coking, auto ignition, flash back or flame holding.

Figure 1:
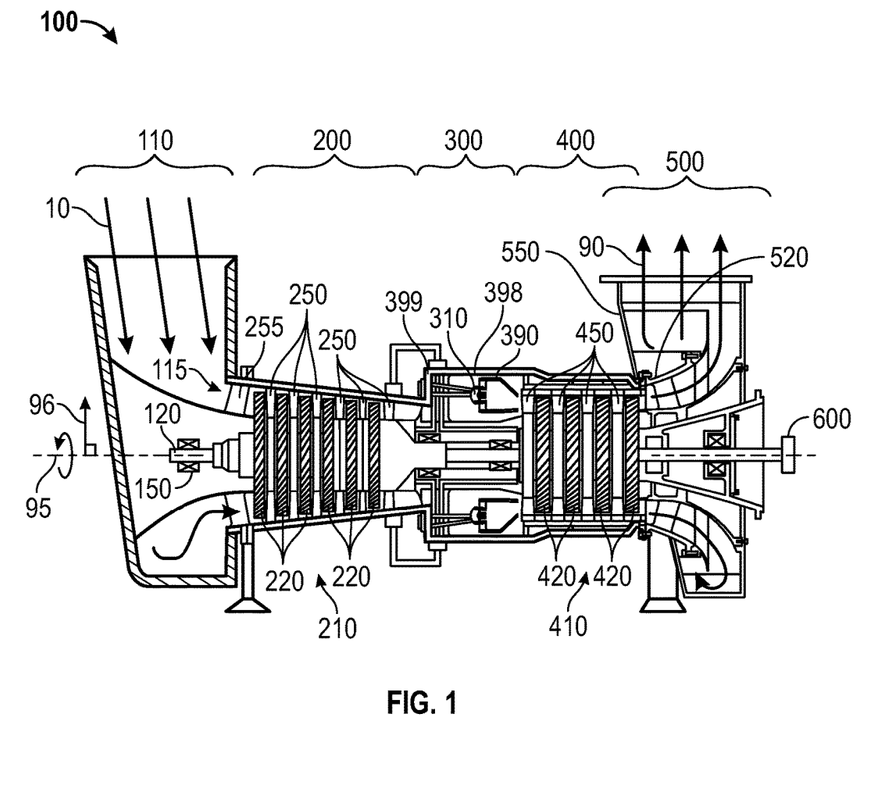
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more injectors 310 and includes one or more combustion chambers 390. Each injector 310 includes an injector head 320 (shown in FIGS. 2 and 3), which includes an inner premix tube 360 (shown in FIGS. 3-5). In the gas turbine engine shown, each injector 310 is installed into combustor 300 in the axial direction relative to center axis 95 through radial case portion 399 of compressor combustor case 398 or the compressor diffuser case.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 520 and an exhaust collector 550.

Figure 2:
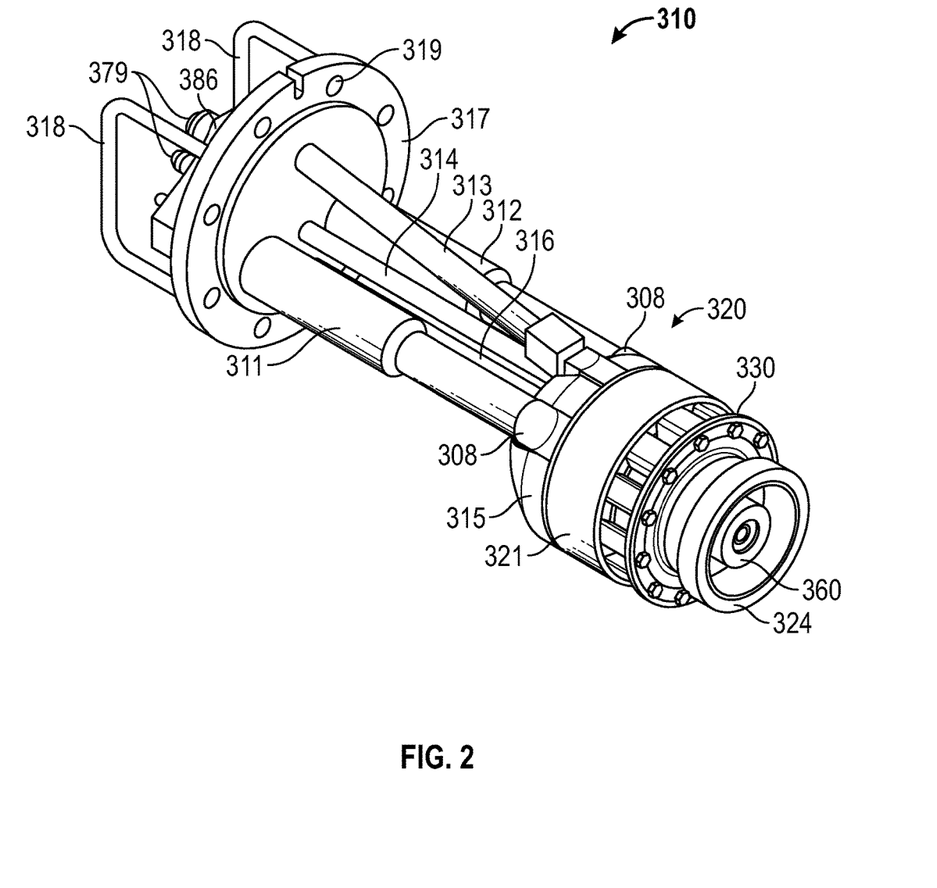
FIG. 2 is a perspective view of the injector of FIG. 1.

FIG. 2 is a perspective view of injector 310 of FIG. 1. Injector 310 may include a flange 317, an injector head 320, a first main gas tube 311, a second main gas tube 312, a support tube 313, a liquid inlet tube stem 314, a liquid inlet tube 354 (shown in FIG. 3), a pilot stem 316, and a liquid pilot tube assembly 370 (shown in FIG. 3). Flange 317 may be a cylindrical disk. Flange 317 includes flange bolt holes 319 for securing injector 310 to gas turbine engine 100 at radial case portion 399 (shown in FIG. 1). Flange 317 may also include handles 318. Fittings 379 such as gas main and liquid main connector assemblies may attach to divider blocks, such as main gas divider block 386, attached to an outer or base surface of flange 317. Liquid and gas fuel sources may be attached to the fittings 379.

Figure 3:
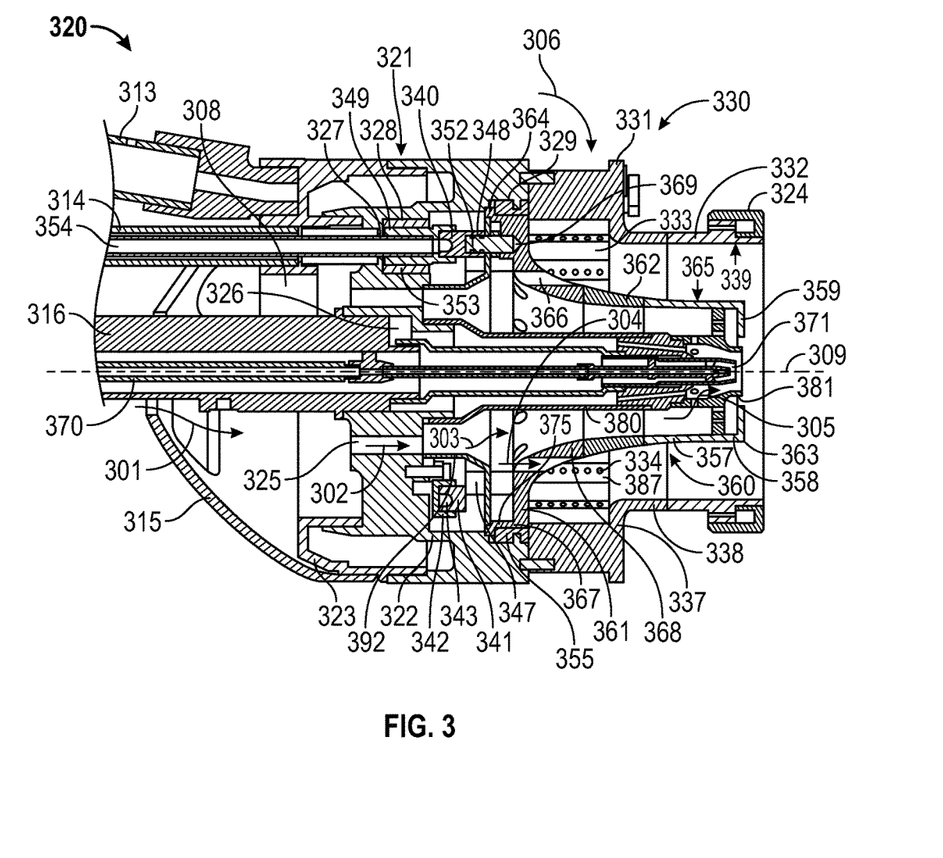
FIG. 3 is a cross-sectional view of the injector head of FIG. 2.

Injector head 320 may include an assembly axis 309 (shown in FIG. 3). All references to radial, axial, and circumferential directions and measures of injector head 320 and the elements of injector head 320 refer to assembly axis 309, and terms such as "inner" and "outer" generally indicate a lesser or greater radial distance from assembly axis 309. The center of flange 317 may be offset from assembly axis 309.

FIG. 3 is a cross-sectional view of the injector head 320 of FIG. 2. Referring to FIGS. 2 and 3, injector head 320 may include body assembly 321, outer cap 315, outer premix barrel 330, inner premix tube 360, premix barrel cap 324, liquid gallery assembly 340, flow shield 392, retaining ring 355, liquid pilot tube assembly 370, and pilot shroud 380. Body assembly 321 may include injector body 322 and gas main shroud 323. Injector body 322 may have a disk or cylindrical shaped base with a coaxial hollow cylinder portion extending in the aft direction from the base. The diameter of the hollow cylinder portion may be larger than the diameter of the base.

Referring to FIG. 3, injector body 322 may include liquid pilot opening 326, feed air passages 325, liquid main opening 327, collar counterbore 328, and retaining ring recess 329. Liquid pilot opening 326 may be coaxial to injector body 322 and may extend through the base of injector body 322 in the axial direction. Feed air passages 325 may also extend through the base of injector body 322 in the axial direction. Feed air passages 325 may be located radially outward from assembly axis 309 and liquid pilot opening 326, and may be located radially inward from an inner surface of the hollow cylinder portion of injector body 322. In embodiments, injector body 322 includes four feed air passages 325.

Liquid main opening 327 may be located radially outward from assembly axis 309 and feed air passages 325, and may be located radially inward from the inner surface of the hollow cylinder portion of injector body 322. Collar counterbore 328 is coaxial to liquid main opening 327 and extends in the forward direction partially into the base of injector body 322 from the aft side of the base.

Retaining ring recess 329 is an annular recess may be located at the aft end of the hollow cylinder portion of injector body 322. Retaining ring recess 329 may be threaded or may include a lip or an annular protrusion configured to hold retaining ring 355 in place.

Referring again to FIGS. 2 and 3, gas main shroud 323 may have a hollow cylinder shape and may have a 'C', 'U', or 'J' shaped cross-section revolved about injector assembly axis 309. Gas main shroud 323 may include fuel transfer bosses 308. Fuel transfer bosses 308 may be thickened portions or boss structures extending from a radially inner portion of the hollow cylinder shape of gas main shroud 323. Fuel transfer bosses 308 may be formed to include fuel transfer passages. One end of the 'C', 'U', or 'J' shape may attach to the hollow cylinder portion of injector body 322 at or near a radially outermost portion of the hollow cylinder portion of injector body 322, while the other end of the 'C', 'U', or 'J' shape may attach to the base of injector body 322 at or near a radially outermost portion of the base. The connection of the 'U' or 'J' shape of gas main shroud 323 to injector body 322 may form an annular chamber between gas main shroud 323 and injector body 322. Injector body 322 and gas main shroud 323 may be brazed or welded together.

Outer cap 315 may be a dome shaped cap that attaches to the body assembly 321 at the radially outer surface of gas main shroud 323. Outer cap 315 may include multiple holes and passageways.

Referring again to FIG. 2, first main gas tube 311 and second main gas tube 312 may extend from the gas main connector assembly (not shown) and flange 317 in the axial direction to fuel transfer bosses 308 (shown in FIG. 3). First main gas tube 311 and second main gas tube 312 may be in flow communication with main gas shroud and the flow transfer holes.

Support tube 313 may connect to flange 317 and gas main shroud 323 of body assembly 321. Support tube 313 may extend axially and radially inward from flange 317 to body assembly 321 relative to injector assembly axis 309.

Liquid inlet tube stem 314 and pilot stem 316 may each extend from flange 317 to injector head 320 in the axial direction. Liquid inlet tube stem 314 may be a circular tube and may attach to gas main shroud 323. Liquid inlet tube stem 314 may attach to gas main shroud 323 near or adjacent to where support tube 313 connects to gas main shroud 323. Pilot stem 316 may attach to and may be partially inserted into liquid pilot opening 326 of injector body 322. Liquid inlet tube stem 314 may be welded or brazed to gas main shroud 323, and pilot stem 316 may be welded or brazed to injector body 322.

Liquid inlet tube 354 may extend axially through liquid inlet tube stem 314 from the liquid main connector and flange 317 to injector body 322 and through liquid main opening 327 of injector body 322.

Referring to FIG. 3, liquid gallery assembly 340 may include collar 353, gallery cover 342, liquid gallery 341, atomizers (not shown), and clocking pin 352. Liquid inlet tube 354 may connect to gallery cover 342. Collar 353 may be located adjacent gallery cover 342 around the end of liquid inlet tube 354 that attaches or connects to gallery cover 342. Collar 353 may be also located within collar counterbore 328.

Liquid gallery 341 includes gallery body and liquid gallery scroll 343. Liquid gallery 341 may also include atomizer inlets (not shown), atomizer bosses 347, and clocking pin boss 348. Gallery body may be an annular ring or hollow cylinder coaxial to liquid gallery assembly 340 and injector assembly axis 309. Liquid gallery 341 is formed to include liquid gallery scroll 343, an annular channel about the forward radial surface of gallery body and extending into gallery body. Liquid gallery scroll 343 may be sized to maintain a predetermined velocity of the liquid fuel passing through liquid gallery scroll 343 during operation of the gas turbine engine 100.

In the embodiment illustrated, the cross-section of liquid gallery scroll 343 is an extended half round or rectangle with a semicircle at the end. Other cross-sectional shapes such as rectangles, squares, and circles may also be used. The edges of the rectangle and square cross-sections may be rounded.

Atomizer bosses 347 may extend from the aft radial surface of the annular ring or hollow cylinder shape of liquid gallery 341 in the axially aft direction. Each atomizer boss 347 may be sized to hold one atomizer. Each atomizer boss 347 may have a hollow cylinder shape with a diameter smaller than the radial thickness of liquid gallery 341. Atomizer bosses 347 may be equally spaced about liquid gallery 341.

In the embodiment illustrated, a clocking pin boss 348 extends from the aft radial surface of the annular ring or hollow cylinder shape of liquid gallery 341 in the axially aft direction between two atomizer bosses 347. Clocking pin boss 348 may be shaped similarly to atomizer bosses 347 and may be sized to hold clocking pin 352. Clocking pin 352 may have a cylindrical shape. Clocking pin 352 may help align inner premix tube 360 within injector head 320.

Gallery cover 342 may be an annular ring or hollow cylinder with a 'C' or 'U' shaped cross-section revolved around the axis of liquid gallery assembly 340 which is coaxial to injector assembly axis 309. Gallery cover 342 may include liquid inlet tube boss 349 extending axially forward from the annular ring or hollow cylinder shape of gallery cover 342. Liquid inlet tube 354 extends into liquid inlet tube boss 349. Collar 353 may be located radially around liquid inlet tube boss 349.

Gallery cover 342 may be sized to fit over the outer and inner circumferential surfaces of liquid gallery 341. The forward radial surface of liquid gallery 341 may contact gallery cover 342 and form a seal with gallery cover 342. Gallery cover 342 may be brazed or welded to liquid gallery 341 at the outer and inner circumferential surfaces of liquid gallery 341.

Flow shield 392 may include an axial portion located radially inward from liquid gallery 341 and a radial portion extending from the axial portion located axially between liquid gallery 341 and inner premix tube 360.

Figure 4:
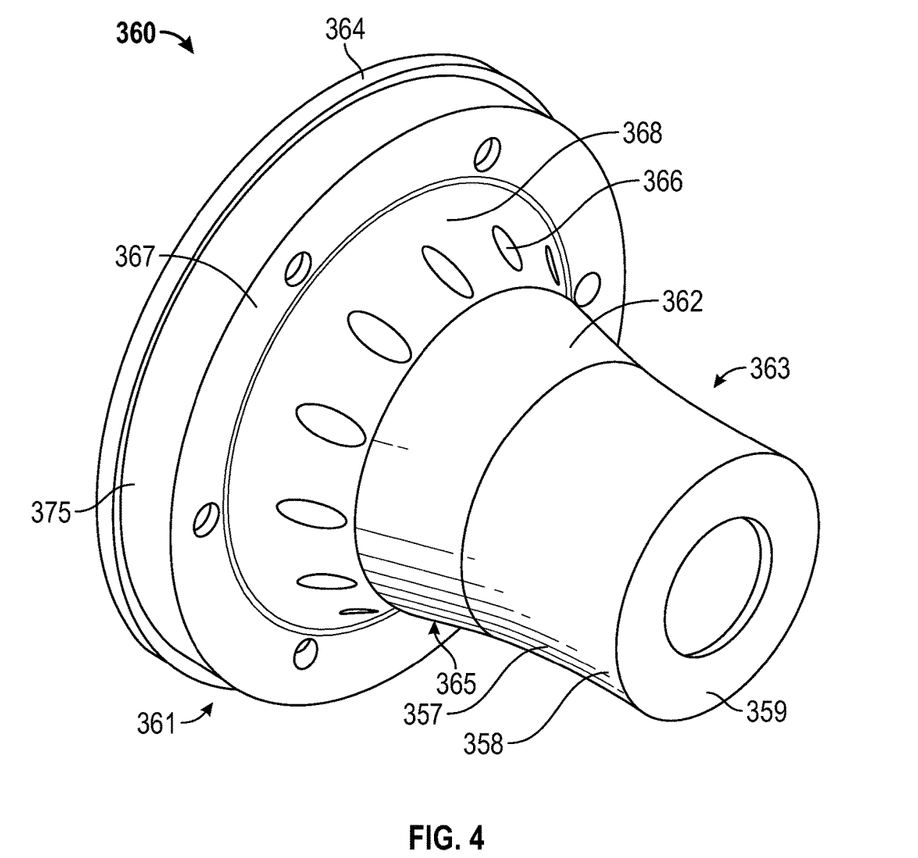
FIG. 4 is a perspective view of the inner premix tube of FIG. 3.

FIG. 4 is a perspective view of the inner premix tube 360 of FIG. 3. Referring to FIGS. 3 and 4, inner premix tube 360 may include transition end 361, middle tube 362, tip end 363, and premix tube inner surface 365. In the embodiment illustrated in FIG. 3, transition end 361 is a hyperbolic funnel that includes an annular disk portion 367 and a redirection portion 368 that curves toward the axially aft direction from the annular disk portion 367. In other embodiments, redirection portion 368 may be formed from various curved cross-sectional shapes revolved about the axis of inner premix tube 360 that transition from a radial direction to an axial direction.

Transition end 361 may also include outer cylindrical portion 375, retaining lip 364, clocking hole 369, and wipe passages 366. Outer cylindrical portion 375 extends axially forward from the radially outer part or portion of annular disk portion 367 in the direction opposite tip end 363. Outer cylindrical portion 375 may have a right hollow circular cylinder shape. Retaining lip 364 may extend radially outward from outer cylindrical portion 375. In the embodiment illustrated, retaining lip 364 also extends axially forward. Clocking hole 369 is sized to receive clocking pin 352 and aligns with clocking pin 352 when assembled. Transition end 361 may include a thickened or boss portion around clocking hole 369.

Transition end 361 is configured to include wipe passages 366. Wipe passages 366 may extend through redirection portion 368. Wipe passages 366 are configured to direct air along premix tube inner surface 365. In the embodiment shown, transition end 361 includes twelve wipe passages 366 equally spaced thirty degrees apart about transition end 361 extending axially through transition end 361. In other embodiments, a different number of wipe passages 366 may be used. Wipe passages 366 are sized and configured so that there is no or a minimal pressure drop across the wipe passage 366. Different shapes, sizing, spacing, and configurations may also be used.

Middle tube 362 may be welded or brazed to the aft end of transition end 361. In the embodiment shown, middle tube 362 continues the hyperbolic funnel shape of transition end 361. In other embodiments, middle tube 362 may be a conical frustum, a funnel, or formed from a cross-section with curved outer and inner surfaces revolved about the axis of inner premix tube 360.

Tip end 363 may be welded or brazed to the aft end of middle tube 362. In the embodiment shown in FIG. 3, tip end 363 includes a curved portion 357, a cylindrical portion 358, and a tip face 359. Curved portion 357 may continue the hyperbolic funnel shape of transition end 361 and middle tube 362 and transitions from the curve of middle tube 362 to a hollow right circular cylinder. Cylindrical portion 358 may be a hollow right circular cylinder extending aft from curved portion 357. Tip face 359 may extend radially inward from the aft end of cylindrical portion 358 and forms an annular disk, the aft end being the axial end of cylindrical portion 358 distal to transition end 361.

Premix tube inner surface 365 may be at least a portion of the outer surface of inner premix tube 360. Premix tube inner surface 365 may be a revolved surface about the axis of inner premix tube 360 that transitions from a radial or an annular ring surface to a circumferential or cylindrical surface. In the embodiment illustrated, premix tube inner surface 365 is a hyperbolic funnel or a segment of a pseudosphere. In other embodiments, the radial surface may transition to a cylindrical surface with a combination of line segments or curves revolved about the axis of inner premix tube 360.

In the embodiment illustrated in FIG. 3, retaining ring 355 is an annular ring. Retaining ring 355 is sized to be installed within retaining ring recess 329. In the embodiment shown, retaining ring 355 and retaining ring recess 329 are threaded to secure retaining ring 355 to injector body 322. Other retaining or locking mechanisms may be used to secure or affix retaining ring 355 to injector body 322. Retaining ring 355 is configured to secure, retain, or lock inner premix tube 360 within injector head 320. In the embodiment shown, retaining ring 355 is axially aft and radially aligned with retaining lip 364, securing inner premix tube 360 to injector body 322; at least a portion of retaining lip 364 extends into retaining ring recess 329.

Referring to FIG. 3, liquid pilot tube assembly 370 may extend axially through pilot stem 316 from the pilot connector and through injector head 320. Liquid pilot tube assembly 370 may be coaxial to injector assembly axis 309. Liquid pilot tube assembly may include a liquid pilot tube tip end 371 located radially within cylindrical portion 358 and axially adjacent to an opening of the annular shape of tip face 359. Pilot shroud 380 may be located radially outward from a portion of liquid pilot tube assembly 370 and located radially inward from inner premix tube 360. Pilot shroud 380 may extend aft from injector body 322. Pilot shroud 380 may include pilot shroud tip 381. Pilot shroud tip 381 may be located radially between pilot tube tip end 371 and cylindrical portion 358, and may extend into the opening of the annular shape of tip face 359.

Outer premix barrel 330 may include barrel 331, barrel end 332, and premix tube outer surface 339. Barrel 331 may include body portion 337, barrel portion 338, and vanes 333. Body portion 337 may have an annular disk shape. Barrel portion 338 may extend axially aft from body portion 337. In the embodiment shown in FIG. 3, barrel portion 338 extends from the aft and radially inner portion of body portion 337. Barrel portion 338 may have a hollow cylinder or cylindrical tube shape. The hollow cylinder or cylindrical tube shape may be tapered. The tapered cylinder may be the frustum of a hollow cone. Vanes 333 may extend axially forward from body portion 337. In the embodiment illustrated in FIG. 3, vanes 333 are wedge shaped with the tip of the wedge truncated or removed. Vanes 333 may include other shapes configured to direct and swirl air into the premix tube. Each vane 333 may include inward surface 387 and vent passages 334. Inward surface 387 is the surface at the end of vane 333 and is the radially inner surface of vane 333. Inward surface 387 may be a circumferential surface. Vent passages 334 may extend through each vane 333 and exit vane 333 at inward surface 387.

Barrel end 332 may be joined to barrel 331 at the aft end of barrel portion 338 with a metal joining process such as welding or brazing. Barrel end 332 may have a hollow cylinder or cylindrical tube shape similar to the shape of barrel portion 338. The hollow cylinder or cylindrical tube shape may be tapered. The tapered cylinder may be the frustum of a hollow cone. Premix barrel cap 324 may be welded or brazed to the aft end of barrel end 332 at the outer surface of barrel end 332. Premix barrel cap 324 may have a 'C', 'U', or 'J' shaped cross-section that is revolved about injector assembly axis 309. Premix barrel cap 324 may form an air pocket or channel with barrel end 332.

Premix tube outer surface 339 may include the radially inner cylindrical surfaces of barrel 331 and barrel end 332. When installed in injector head 320, premix tube outer surface 339 may be located radially outward from premix tube inner surface 365.

Figure 5:
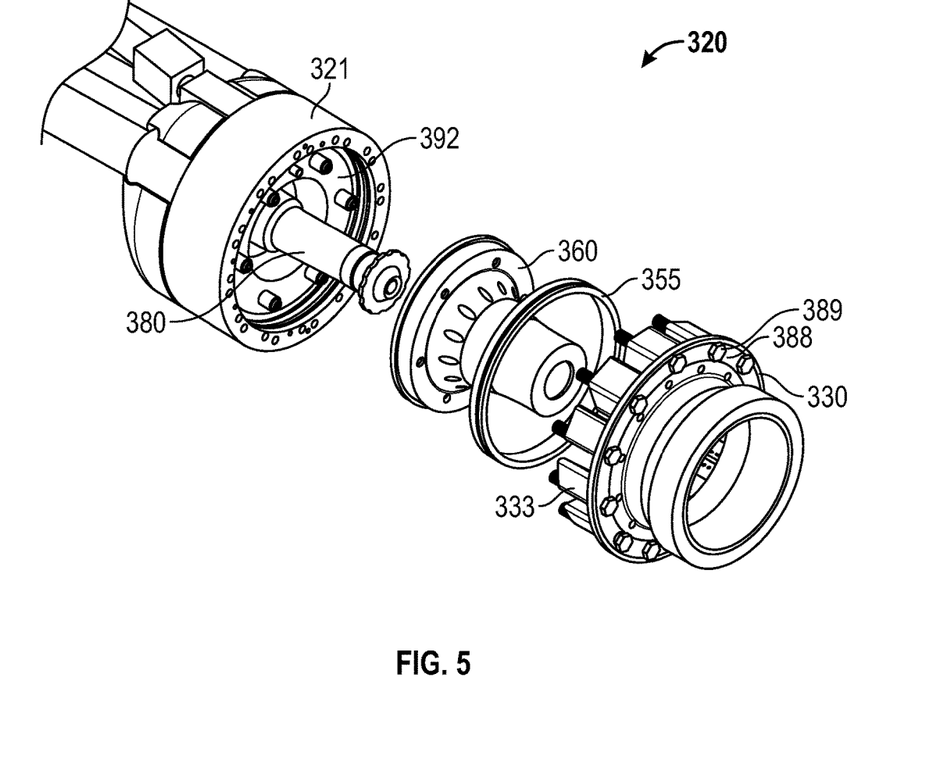
FIG. 5 is an exploded view of the injector head of FIG. 3.

FIG. 5 is an exploded view of the injector head 320 of FIG. 3. Referring to FIGS. 3 and 5, outer premix barrel 330 may be secured to body assembly 321 with bolts 389 and lock plates 388. Inner premix tube 360 may be secured to body assembly 321 by retaining ring 355. In some embodiments, retaining ring 355 is screwed on to body assembly 321.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it is diffused and enters the combustor 300. Referring to FIG. 3, a portion of air 10 travels along path 306 and enters injector 310 between vanes 333 where fuel is added. Air 10 and the fuel are mixed and swirled between premix tube outer surface 339 and premix tube inner surface 365.

Referring to FIG. 1, the air 10 and fuel mixture is injected into the combustion chamber 390 and combusted. Energy is extracted from the combustion reaction via the turbine 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

A pilot flame may be used to maintain flame stability during operation of gas turbine engine 100. Referring to FIG. 3, feed air, a portion of the air 10, enters injector head 320 through outer cap 315 along path 301. The feed air travels through feed air passages 325 along path 302. A portion of the feed air is used as pilot feed air. The pilot feed air continues along path 303 between inner premix tube 360 and pilot shroud 380 before passing through pilot shroud tip 381 along path 305 to be used in conjunction with the combustion of the pilot fuel.

Some of the fuel traveling between premix tube outer surface 339 and premix tube inner surface 365 may accumulate on or wet premix tube inner surface 365. A wetted premix tube inner surface 365 may result in the accumulated fuel coking on premix tube inner surface 365 or may cause auto ignition, flashback, or flame holding.

In the embodiment illustrated in FIG. 3, another portion of the feed air is used as wipe air. The wipe air passes through wipe passages 366 along path 304 and is directed along premix tube inner surface 365. The wipe air may prevent the fuel from accumulating or wetting premix tube inner surface 365 or may push accumulated fuel off of premix tube inner surface 365. Preventing accumulation of fuel on premix tube inner surface 365 and removing accumulated fuel from premix tube inner surface 365 may prevent or reduce fuel coking and may prevent or reduce the chances of auto ignition, flashback, and flame holding. Preventing or reducing auto ignition, flashback, and flame holding may increase the life of injector head 320 including the life of inner premix tube 360 and outer premix barrel 330.

During the lifetime of an injector 310, it may be overhauled. Components of injector head 320 including outer premix barrel 330, inner premix tube 360, and liquid gallery assembly 340 may need to be repaired or replaced. Referring to FIG. 5, outer premix barrel 330, including vanes 333, is removed from injector head 320 by removing bolts 389. Inner premix tube 360 is removed after removing outer premix barrel 330 by removing retaining ring 355. Removing outer premix barrel 330 and inner premix tube 360 provides access to liquid gallery assembly 340, allowing the repair or replacement of liquid gallery assembly 340. Flow shield 392 may also need to be removed to access liquid gallery assembly 340.

Referring to FIG. 3, liquid gallery assembly 340 may be welded or brazed to injector body 322. In embodiments, collar 353 is brazed into collar counterbore 328. Liquid gallery assembly 340 is removed from injector head 320 by machining out the portions of liquid gallery assembly 340 welded or brazed to injector body 322. Providing a removable outer premix barrel 330 with vanes 333, a removable inner premix tube 360, and access to liquid gallery assembly 340 may reduce overhaul costs and may increase the life of injectors 310.

During operation of gas turbine engine 100 barrel end 332 of outer premix barrel 330 and tip end 363 of inner premix tube 360 are adjacent combustion chamber 390 and exposed to high temperatures. Barrel end 332 and tip end 363 may need to be replaced sooner than other portions of outer premix barrel 330 and inner premix tube 360. Replacing barrel end 332 or tip end 363 may reduce repair and overhaul costs of injectors 310.

Figure 6:
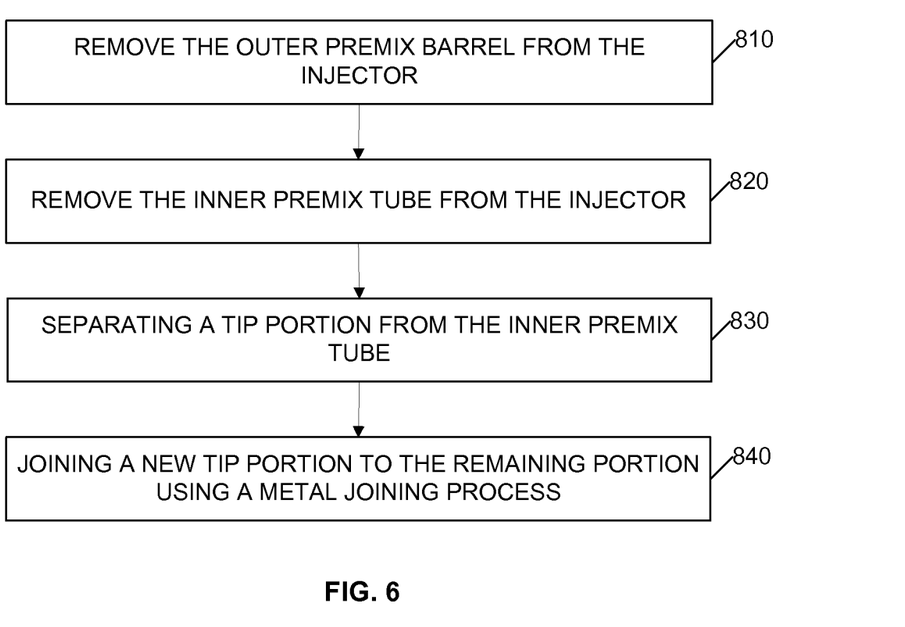
FIG. 6 is a flowchart of a method for overhauling the injector of FIG. 2.

FIG. 6 is a flowchart of a method for overhauling an injector 310. The method includes removing outer premix barrel 330 from the injector 310 at step 810. Step 810 includes removing bolts 389 that secure outer premix barrel 330 to injector body 322. Step 810 is followed by removing inner premix tube 360 from injector 310 at step 820. Step 820 includes removing retaining ring 355. Removing retaining ring 355 may include unscrewing retaining ring 355 from injector body 322.

Step 820 is followed by separating a tip portion from the inner premix tube 360 at step 830. The tip portion includes tip end 363. In some embodiments, tip portion also includes middle tube 362. Step 830 may include removing a weld or braze between the tip portion and a remaining portion. The remaining portion includes transition end 361. In some embodiments, remaining portion also includes middle tube 362 and tip portion does not include middle tube 362.

Step 830 is followed by joining a new tip portion to the remaining portion using a metal joining process at step 840. Metal joining processes such as welding and brazing may be used. In one embodiment, electron beam welding is used.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular outer premix barrel, it will be appreciated that the outer premix barrel in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. An inner premix tube for a fuel injector of a gas turbine engine, the inner premix tube comprising:
   a transition end including
      an annular disk portion with an annular disk shape, and
      a redirection portion extending radially inward and axially along a central axis of the annular disk portion, and
      a plurality of wipe passages extending through the transition end;
   a tip end coaxial to the transition end, the tip end including
      a cylindrical portion with hollow right circular cylinder shape, the cylindrical portion extending axially, and
      a tip face with an annular disk shape, the tip face extending radially inward from an axial end of the cylindrical portion, the tip face being distal to the transition end; and
   a premix tube inner surface, the premix tube inner surface being a radially outer surface including an outer surface of the redirection portion and an outer surface of the cylindrical portion forming a radially inner boundary of a fuel mixing duct.

2. The inner premix tube of claim 1, further comprising:
   a middle tube extending between the transition end and the tip end;
   wherein the tip end further includes a curved portion adjacent the middle tube.

3. The inner premix tube of claim 2, wherein the middle tube is welded to the transition end and the tip end is welded to the middle tube.

4. The inner premix tube of claim 2, wherein the annular disk portion, the redirection portion, the middle tube, the curved portion, and the cylindrical portion form a tube with a hyperbolic funnel shape.

5. The inner premix tube of claim 4, wherein the transition end includes an outer cylindrical portion extending axially from an outer portion of the annular disk portion in a direction opposite the tip end, and a retaining lip extends radially outward from the outer cylindrical portion.

6. The inner premix tube of claim 1, wherein a retaining lip extends radially outward from a radially outermost portion of the transition end.

7. The inner premix tube of claim 1, wherein each wipe passage of the plurality of wipe passages is configured to direct air along the premix tube inner surface.

8. The inner premix tube of claim 1, wherein each of the plurality of wipe passages extends axially through the redirection portion.

9. A fuel injector of a gas turbine engine comprising:
the inner premix tube of claim 6;
an injector body including
 a disk portion, and
 a hollow cylinder portion extending axially from the disk portion in an aft direction, the hollow cylinder portion including
  a retaining ring recess located at an aft and radially inner portion of the hollow cylinder portion, the retaining ring recess being an annular recess,
 wherein at least a portion of the retaining lip of the inner premix tube is located within the retaining ring recess;
a retaining ring with an annular ring shape, the retaining ring being sized to fit within the retaining ring recess and to radially align with the retaining lip, wherein the retaining ring is configured to secure the inner premix tube to the injector body; and
an outer premix barrel adjacent the injector body and radially outward from the inner premix tube, the outer premix barrel including
 a body portion,
 a barrel portion extending axially in the aft direction from the body portion, and
 a plurality of vanes extending axially in the forward direction from the body portion.

10. The fuel injector of claim 9, wherein the inner premix tube is inserted axially into the injector body with at least a portion of the retaining lip extending into the retaining ring recess and the retaining ring is affixed to the injector body within the retaining ring recess axially aft of the retaining lip and radially outward of the outer cylindrical portion.

11. A method for overhauling the inner premix tube of claim 1, comprising:
removing an outer premix barrel from an injector;
removing the inner premix tube from the injector, removing the inner premix tube including removing a retaining ring configured to secure the inner premix tube to an injector body of the injector;
separating the tip end from the inner premix tube;
joining a new tip end to a remaining portion of the inner premix tube with a metal joining process, the remaining portion including the transition end.

12. A method for overhauling a gas turbine engine injector, comprising: removing an outer premix barrel from the gas turbine engine injector; removing an inner premix tube from the gas turbine engine injector; removing the inner premix tube including removing a retaining ring configured to secure the inner premix tube to an injector body of the gas turbine engine injector; separating a tip portion from the inner premix tube, the tip portion including a tip end including a cylindrical portion with a hollow cylinder shape and a tip face with an annular disk shape, joining a new tip portion to a remaining portion of the inner premix tube with a metal joining process, the remaining portion including a transition end including an annular disk portion with an annular disk shape and a redirection portion extending radially inward and axially from the annular disk portion, and a plurality of wipe passages extending through the transition end, the new tip end is coaxial to the transition end, the new tip end including a new cylindrical portion with hollow right circular cylinder shape, the new cylindrical portion extending axially, and a new tip face with a new annular disk shape, the new tip face extending radially inward from an axial end of the new cylindrical portion, the new tip face being distal to the transition end; and a premix tube inner tube surface, the premix tube inner surface being a radially outer surface including an outer surface of the redirection portion and an outer surface of the new cylindrical portion forming a radially inner boundary of a fuel mixing duct.

13. The method of claim 12, wherein joining a new tip portion to a remaining portion of the inner premix tube with a metal joining process includes welding the new tip portion to the remaining portion.

14. The method of claim 13, wherein welding the new tip portion to the remaining portion includes electron beam welding.

15. The method of claim 12, wherein the tip portion includes a middle tube welded to the tip end and separating the tip portion from the inner premix tube includes removing a weld between the transition end and the middle tube.

16. The method of claim 12, wherein the remaining portion includes a middle tube welded to the transition end and separating the tip portion from the inner premix tube includes removing a weld between the middle tube and the tip end.

17. The method of claim 16, wherein joining the new tip portion to the remaining portion of the inner premix tube with the metal joining process includes welding a new tip end to the middle tube.

* * * * *